(12) United States Patent
Deng et al.

(10) Patent No.: US 12,140,827 B2
(45) Date of Patent: Nov. 12, 2024

(54) DISPLAY PANEL AND DISPLAY DEVICE

(71) Applicant: Wuhan China Star Optoelectronics Technology Co., Ltd., Hubei (CN)

(72) Inventors: Qian Deng, Hubei (CN); Wei Cheng, Hubei (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 17/781,016

(22) PCT Filed: May 23, 2022

(86) PCT No.: PCT/CN2022/094395
§ 371 (c)(1),
(2) Date: May 30, 2022

(87) PCT Pub. No.: WO2023/216311
PCT Pub. Date: Nov. 16, 2023

(65) Prior Publication Data
US 2024/0160054 A1 May 16, 2024

(30) Foreign Application Priority Data
May 11, 2022 (CN) .......................... 202210511463.9

(51) Int. Cl.
*G02F 1/13* (2006.01)
*G02F 1/133* (2006.01)
(Continued)

(52) U.S. Cl.
CPC ........ *G02F 1/1326* (2013.01); *G02F 1/13318* (2013.01); *G02F 1/13338* (2013.01);
(Continued)

(58) Field of Classification Search
CPC ............... G02F 1/1326; G02F 1/13318; G02F 1/13338; G02F 1/133531; G02F 1/133638; G02F 1/13718
See application file for complete search history.

(56) References Cited

U.S. PATENT DOCUMENTS 11,009,737 B1 * 5/2021 Matsuda ........... G02F 1/133504
11,480,800 B1 * 10/2022 Schuck .................. H04N 23/50
(Continued)

FOREIGN PATENT DOCUMENTS

| CN | 105954917 | 9/2016 |
| CN | 110764307 | 2/2020 |

(Continued)

OTHER PUBLICATIONS

Notification of Office Action and Search Report Dated May 7, 2023 From The State Intellectual Property Office of the People's Republic of China Re. Application No. 202210511463.9 and Its Translation Into English. (27 Pages).

(Continued)

*Primary Examiner* — Ibrahim A Khan

(57) ABSTRACT

A display panel and a display device are provided by the present application. The display panel includes a photosensitive functional region, and an optical waveguide module is disposed on a light-emitting side of the panel main body. The optical waveguide module comprises an optical coupling-in part, an optical waveguide layer, and an optical coupling-out part. The optical coupling-in part is connected with the optical waveguide layer, the optical coupling-out part is connected with the optical waveguide layer. The optical coupling-out part is positioned at a side of the light coupling-in portion and opposites to the photosensitive functional region. The optical coupling-out part is configured to introduce part of the light from the outside world. The optical (Continued)

waveguide layer is configured to guide the light introduced by the optical coupling-in part.

20 Claims, 9 Drawing Sheets

(51) Int. Cl.
    *G02F 1/1333*     (2006.01)
    *G02F 1/1335*     (2006.01)
    *G02F 1/13363*     (2006.01)
    *G02F 1/137*     (2006.01)

(52) U.S. Cl.
    CPC .. *G02F 1/133531* (2021.01); *G02F 1/133638* (2021.01); *G02F 1/13718* (2013.01)

(56) References Cited

U.S. PATENT DOCUMENTS

| | | | |
|---|---|---|---|
| 2007/0058383 A1* | 3/2007 | Gunther | F21S 43/237 362/494 |
| 2018/0017801 A1 | 1/2018 | Chang et al. | |
| 2018/0052501 A1* | 2/2018 | Jones, Jr. | G06F 3/011 |
| 2018/0239177 A1* | 8/2018 | Oh | G02B 6/0076 |
| 2019/0086674 A1* | 3/2019 | Sinay | G02B 27/0172 |
| 2020/0249754 A1* | 8/2020 | Morozov | G06F 3/0304 |
| 2021/0048676 A1* | 2/2021 | Manly | G02B 27/281 |
| 2021/0141274 A1* | 5/2021 | Wei | G02F 1/133624 |
| 2021/0199970 A1 | 7/2021 | Huang et al. | |
| 2021/0294106 A1* | 9/2021 | Meitav | H04N 9/31 |
| 2022/0050286 A1* | 2/2022 | Amirsolaimani | G02B 26/101 |

FOREIGN PATENT DOCUMENTS

| | | |
|---|---|---|
| CN | 111308717 | 6/2020 |
| CN | 112017542 | 12/2020 |
| CN | 112104773 | 12/2020 |
| CN | 213581720 | 6/2021 |
| CN | 214375582 | 10/2021 |
| CN | 113885119 | 1/2022 |
| CN | 113900182 | 1/2022 |
| CN | 114355611 | 4/2022 |

OTHER PUBLICATIONS

International Search Report and the Written Opinion Dated Dec. 16, 2022 From the International Searching Authority Re. Application No. PCT/CN2022/094395 and Its Translation Into English. (18 Pages).

\* cited by examiner

DISPLAY PANEL AND DISPLAY DEVICE

RELATED APPLICATIONS

This application is a National Phase of PCT Patent Application No. PCT/CN2022/094395 having International filing date of May 23, 2022, which claims the benefit of priority of Chinese Patent Application No. 202210511463.9 filed on May 11, 2022. The contents of the above applications are all incorporated by reference as if fully set forth herein in their entirety.

FIELD AND BACKGROUND OF THE INVENTION

The present application relates to the field of display technology, and in particular, to a display panel and a display device.

In a conventional vehicle-mounted fatigue detection system, the conventional integrated vehicle-mounted under-screen camera adopts a blind hole design of the instrument, combined with a treatment method of smoke and black, the camera and the blind hole are overlapped, and the camera is disposed in an opening of the backlight module and hidden at a bottom of the screen.

During research and practice of the prior art, inventor of the present application found that, in order to facilitate a camera to accurately and comprehensively acquire a portrait, a blind hole is usually set near a center of the display region, which affects an integrity of a vehicle screen display. In addition, a blind hole-free design can also be used to directly place the camera under a car screen, but a pixel arrangement of the car screen in the corresponding camera region requires a special design, which is different from a display region and has a complex process.

It can be understood that, whether it is a conventional blind hole design or a special design of the display region opposite to the pixel head region, in order to ensure that the camera can acquire images accurately, a position of the camera cannot be set flexibly.

SUMMARY OF THE INVENTION

Embodiments of the present application provide a display panel and a display device to set a camera flexibly.

One embodiment of the present application provides a display panel including a photosensitive functional region, wherein the display panel further includes:
  a panel body; and
  an optical waveguide module, wherein the optical waveguide module is disposed on a light emitting side of the panel body, wherein the optical waveguide module includes an optical coupling-in part, an optical waveguide layer, and an optical coupling-out part, wherein the optical coupling-in part is connected to the optical waveguide layer, the optical coupling-out part is connected to the optical waveguide layer, and wherein the optical coupling-out part is positioned on a side of the optical coupling-in part and opposites to the photosensitive functional region; and
  wherein the optical coupling-in part is configured to introduce part of the light from an outside, wherein the optical waveguide layer is configured to conduct the light introduced by the optical coupling-in part, and wherein the optical coupling-out part is configured to exporting the light in the optical waveguide layer.

Optionally, in some embodiments of the present application, the optical coupling-in part is provided on a side of the optical waveguide layer close to the panel body, wherein the optical coupling-in part includes an alignment layer and a liquid crystal polymer film provided on the alignment layer; and
  wherein the display panel further includes a first linear polarizer and a first quarter-wave plate, wherein the first quarter-wave plate is disposed on a side of the optical waveguide module away from the panel body, and wherein the first linear polarizer is disposed on a side of the first quarter-wave plate away from the panel body.

Optionally, in some embodiments of the present application, the display panel further includes a second linear polarizer and a second quarter-wave plate, wherein the second quarter-wave plate is disposed on a side of the optical waveguide module close to the panel body, and wherein the second linear polarizer is disposed on a side of the second quarter-wave plate close to the panel body.

Optionally, in some embodiments of the present application, the first linear polarizer has a first polarization axis, wherein the first quarter-wave plate has a first fast axis, and wherein an angle between the first fast axis and the first polarization axis is 45°; and
  wherein the liquid crystal polymer film is a right chiral liquid crystal polymer film.

Optionally, in some embodiments of the present application, the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the second polarization axis is 45° from a clockwise direction of the second fast axis.

Optionally, in some embodiments of the present application, the first linear polarizer has a first polarization axis, wherein the first quarter-wave plate has a first fast axis, and wherein an angle between the first fast axis and the first polarization axis is 45° from a clockwise direction of the first fast axis; and wherein the liquid crystal polymer film is a left chiral liquid crystal polymer film.

Optionally, in some embodiments of the present application, the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the first polarization axis is 45° from a counterclockwise direction of the second fast axis.

Optionally, in some embodiments of the present application, the display panel further includes a display region and a frame region positioned on a peripheral side of the display region, wherein the photosensitive functional region is disposed in the frame region, wherein the optical coupling-in part is positioned in the display region of the display panel, and wherein the optical coupling-out part is positioned in the frame region.

Optionally, in some embodiments of the present application, the optical coupling-out part is selected from one of an embossed grating, a liquid crystal grating, and an array grating formed in the optical waveguide layer, wherein a chiral direction of the liquid crystal grating is the same as a chiral direction of the optical coupling-in part.

Optionally, in some embodiments of the present application, the panel body is a liquid crystal panel body, wherein the display panel further includes a third linear polarizer, wherein the third linear polarizer is disposed on a side of the panel body away from the second polarizer, wherein the third linear polarizer has a third polarization axis, and wherein the third polarization axis is perpendicular to the second polarization axis.

Optionally, in some embodiments of the present application, the display panel further includes a first adhesive layer positioned in a frame region of the display panel, wherein the first adhesive layer is connected between the optical waveguide module and the first quarter-wave plate, wherein a first dielectric layer is disposed between the optical waveguide layer and the first quarter-wave plate, and wherein a refractive index of the optical waveguide layer is greater than a refractive index of the first dielectric layer refractive index; and wherein the display panel further includes a second adhesive layer positioned in the frame region of the display panel, wherein the second adhesive layer is connected between the optical waveguide module and the second quarter-wave plate, wherein a second dielectric layer is disposed between the optical waveguide layer and the second quarter-wave plate, and wherein a refractive index of the optical waveguide layer is greater than a refractive index of the second dielectric layer.

Optionally, in some embodiments of the present application, the display panel further includes a first adhesive layer positioned in a frame region of the display panel, wherein the first adhesive layer is connected between the optical waveguide module and a first quarter-wave plate, and wherein a first gas layer is provided between the optical waveguide layer and the first quarter-wave plate; and wherein the display panel further includes a second adhesive layer positioned in the frame region of the display panel, wherein the second adhesive layer is connected between the optical waveguide module and the second quarter-wave plate, and wherein a second gas layer is provided between the optical waveguide layer and the second quarter-wave plate.

Optionally, in some embodiments of the present application, the display panel further includes a first adhesive layer, wherein the first adhesive layer is connected between the optical waveguide module and the first quarter-wave plate, wherein an entire surface of the first adhesive layer is attached to the optical waveguide module, and wherein a refractive index of the optical waveguide layer is greater than a refractive index of the first adhesive layer; and wherein the display panel further includes a second adhesive layer, wherein the second adhesive layer is connected between the optical waveguide module and the second quarter-wave plate, wherein an entire surface of the second adhesive layer is adhered to the optical waveguide module, and wherein a refractive index of the optical waveguide layer is greater than a refractive index of the second adhesive layer.

Optionally, in some embodiments of the present application, the optical waveguide layer is a cover plate.

Correspondingly, embodiments of the present application further provide a display device, which includes a camera and the display panel according to any one of the above embodiments, wherein the camera is disposed oppositely to the photosensitive functional region, and the camera is positioned on a side of the panel body away from the optical waveguide module.

In some embodiments of the present application, the camera is an infrared camera.

In some embodiments of the present application, the display panel includes a photosensitive functional region, and the display panel further includes:

a panel body; and an optical waveguide module, wherein the optical waveguide module is disposed on a light emitting side of the panel body, wherein the optical waveguide module includes an optical coupling-in part, an optical waveguide layer, and an optical coupling-out part, wherein the optical coupling-in part is connected to the optical waveguide layer, wherein the optical coupling-out part is connected to the optical waveguide layer, and wherein the optical coupling-out part is positioned on a side of the optical coupling-in part and opposites to the photosensitive functional region;

wherein the light coupling part is configured to introduce part of the light from the outside, wherein the optical waveguide layer is configured to conduct the light introduced by the light coupling part, and wherein the light coupling out part is configured to exporting the light in the optical waveguide layer.

Optionally, in some embodiments of the present application, the optical coupling-in part is provided on a side of the optical waveguide layer close to the panel body, wherein the optical coupling-in part includes an alignment layer and a liquid crystal polymer film which is provided on the alignment layer; and wherein the display panel further includes a first linear polarizer and a first quarter-wave plate, wherein the first quarter-wave plate is disposed on a side of the optical waveguide module away from the panel body, and wherein the first linear polarizer is disposed on a side of the first quarter-wave plate away from the panel body.

Optionally, in some embodiments of the present application, the display panel further includes a second linear polarizer and a second quarter-wave plate, wherein the second quarter-wave plate is disposed on a side of the optical waveguide module close to the panel body, and wherein the second linear polarizer is disposed on a side of the second quarter-wave plate close to the panel body.

Optionally, in some embodiments of the present application, the first linear polarizer has a first polarization axis, wherein the first quarter-wave plate has a first fast axis, and wherein an angle between the first fast axis and the first polarization axis is 45°; and wherein the liquid crystal polymer film is a right chiral liquid crystal polymer film.

Optionally, in some embodiments of the present application, the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the second polarization axis is 45° from a clockwise direction of the second fast axis.

Optionally, in some embodiments of the present application, the first linear polarizer has a first polarization axis, wherein the first quarter-wave plate has a first fast axis, and wherein an angle between the first fast axis and the first polarization axis is 45° from a clockwise direction of the first fast axis; and wherein the liquid crystal polymer film is a left chiral liquid crystal polymer film.

Optionally, in some embodiments of the present application, the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the first polarization axis is 45° from a counterclockwise direction of the second fast axis.

Optionally, in some embodiments of the present application, the display panel further includes a display region and a frame region positioned on a peripheral side of the display region, wherein the photosensitive functional region is disposed in the frame region, and wherein the optical coupling-in part is positioned in the display region of the display panel, and wherein the optical coupling-out part is positioned in the frame region.

Optionally, in some embodiments of the present application, the optical coupling-out part is selected from one of an embossed grating, a liquid crystal grating, and an array grating formed in the optical waveguide layer, wherein a chiral direction of the liquid crystal grating is the same as a chiral direction of the optical coupling-in part.

Optionally, in some embodiments of the present application, the panel body is a liquid crystal panel body, wherein the display panel further includes a third linear polarizer, wherein the third linear polarizer is disposed on a side of the panel body away from the second polarizer, wherein the third linear polarizer has a third polarization axis, and wherein the third polarization axis is perpendicular to the second polarization axis.

Optionally, in some embodiments of the present application, the display panel further includes a first adhesive layer positioned in a frame region of the display panel, wherein the first adhesive layer is connected between the optical waveguide module and the first quarter-wave plate, wherein a first dielectric layer is disposed between the optical waveguide layer and the first quarter-wave plate, and wherein a refractive index of the optical waveguide layer is greater than a refractive index of the first dielectric layer refractive index;

wherein the display panel further includes a second adhesive layer positioned in the frame region of the display panel, wherein the second adhesive layer is connected between the optical waveguide module and the second quarter-wave plate, wherein a second dielectric layer is disposed between the optical waveguide layer and the second quarter-wave plate, and wherein a refractive index of the optical waveguide layer is greater than a refractive index of the second dielectric layer.

Optionally, in some embodiments of the present application, the display panel further includes a first adhesive layer positioned in a frame region of the display panel, wherein the first adhesive layer is connected between the optical waveguide module and a first quarter-wave plate, and wherein a first gas layer is provided between the optical waveguide layer and the first quarter-wave plate;

wherein the display panel further includes a second adhesive layer positioned in the frame region of the display panel, wherein the second adhesive layer is connected between the optical waveguide module and the second quarter-wave plate, and wherein a second gas layer is provided between the optical waveguide layer and the second quarter-wave plate.

Optionally, in some embodiments of the present application, the display panel further includes a first adhesive layer, wherein the first adhesive layer is connected between the optical waveguide module and the first quarter-wave plate, wherein an entire surface of the first adhesive layer is attached to the optical waveguide module, and wherein a refractive index of the optical waveguide layer is greater than a refractive index of the first adhesive layer; and wherein the display panel further includes a second adhesive layer, wherein the second adhesive layer is connected between the optical waveguide module and the second quarter-wave plate, wherein an entire surface of the second adhesive layer is adhered to the optical waveguide module, and wherein a refractive index of the optical waveguide layer is greater than a refractive index of the second adhesive layer.

Optionally, in some embodiments of the present application, the optical waveguide layer is a cover plate.

The display panel of the embodiment of the present application includes a photosensitive functional region, wherein the optical waveguide module is disposed on a light-emitting side of the panel main body. The optical waveguide module includes an optical coupling-in part, an optical waveguide layer and an optical coupling-out part. The optical coupling-in part is connected to the optical waveguide layer. The optical coupling-out part is connected to the optical waveguide layer. The optical coupling-out part is positioned at a side of the light coupling-in portion and opposites to the photosensitive functional region.

It can be understood that the optical coupling-in part is configured to introduce part of the light from the outside world. The optical waveguide layer is used to guide the light introduced by the optical coupling part. The optical coupling-out part is configured to lead out the light in the optical waveguide layer. That is to say, in this embodiment, the incident light from the outside can be conducted to the region of the light coupling-out part, and then led out by the light coupling-out part to the external camera. Therefore, the external camera can also be flexibly set according to the actual location needs.

In addition, it is not necessary to dig holes or design special pixels in the display region of the panel body to achieve the effect of full display when the optical coupling-out part is positioned in the non-display region (frame region).

BRIEF DESCRIPTION OF THE SEVERAL VIEWS OF THE DRAWINGS

In order to illustrate the technical solutions in the embodiments of the present application more clearly, the following briefly introduces the figures that are used in the description of the embodiments. Obviously, the figures in the following description are only some embodiments of the present application. For those skilled in the art, other figures can also be obtained from these figures without inventive steps.

DESCRIPTION OF SPECIFIC EMBODIMENTS OF THE INVENTION

The technical solutions in the embodiments of the present application will be clearly and completely described below with reference to the figures in the embodiments of the present application. Obviously, the described embodiments are only a part of the embodiments of the present application, rather than all the embodiments. Based on the embodiments in the present application, all other embodiments obtained by those skilled in the art without inventive steps fall within a protection scope of the present application. In addition, it should be understood that the specific embodiments described herein are only used to illustrate and explain the present application, but not to limit the present application. In the present application, unless otherwise stated, the directional words used such as "upper" and "lower" generally refer to the upper and lower sides of the device in actual use or operating state, specifically the figure direction in the accompanying figures; while "inside" and "outside" refer to an outline of the device.

Embodiments of the present application provide a display panel and a display device, which will be described in detail below. It should be noted that a description order of the following embodiments is not intended to limit a preferred order of the embodiments.

Figure 1:
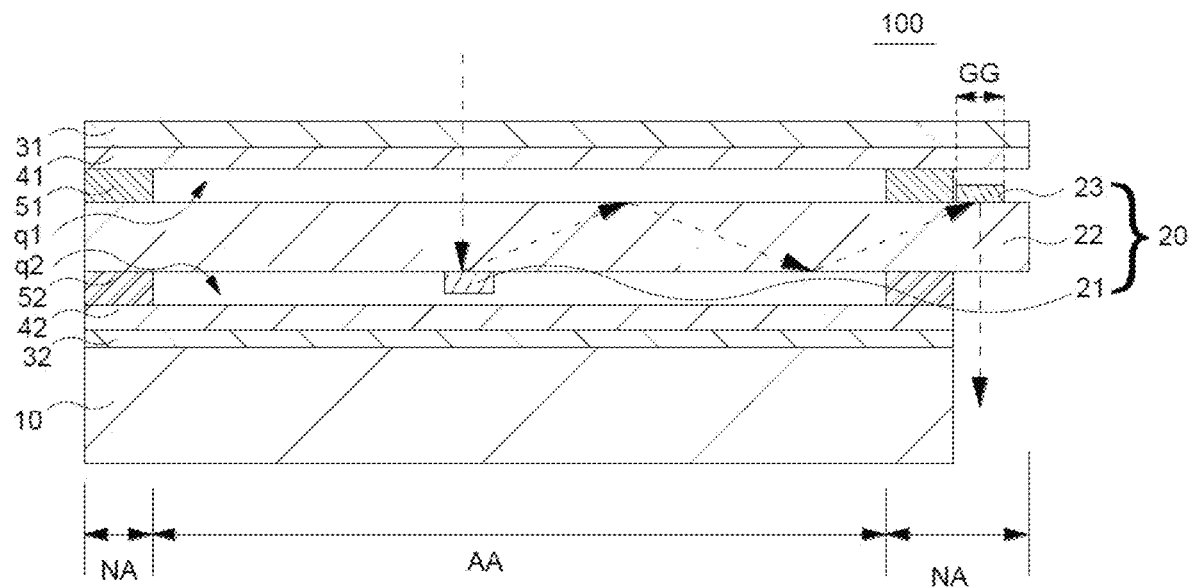
FIG. 1 is a schematic structural diagram of a display panel provided by a first embodiment of the present application.

Referring to FIG. 1, a first embodiment of the present application provides a display panel 100 including a photosensitive functional region GG. The display panel 100 includes a panel body 10 and an optical waveguide module 20. The optical waveguide module 20 is disposed on a light-emitting side of the panel body 10.

The optical waveguide module 20 includes an optical coupling-in part 21, an optical waveguide layer 22, and an optical coupling-out part 23. The optical coupling-in part 21 is connected to the optical waveguide layer 22. The optical coupling-out part 23 is connected to the optical waveguide layer 22. The optical coupling-out part 23 is positioned on a side of the optical coupling-in part 21 and opposites to the photosensitive functional region GG.

It can be understood that, the optical coupling-in part 21 is configured to introduce part of the light from the outside world. The optical waveguide layer 22 is configured to guide the light introduced by the optical coupling-in part 21. The optical coupling-out part 23 is configured to lead out the light in the optical waveguide layer 22. That is, in the first embodiment, the incident light from the outside can be conducted to the region of the light coupling-out part 23, and the light can be led out by the light-coupling-out part 23 to the external camera. Therefore, the external camera can also be flexibly set according to the actual location needs.

Optionally, in the first embodiment, the panel body 10 may be selected from an organic light-emitting diode (OLED) panel, a quantum dot light-emitting diode (QLED) panel, a micro light-emitting diode (Mirco-LED) panel, and a mini light-emitting diode (Mini-LED) panel.

In the first embodiment, the panel body 10 is an organic light emitting diode panel as an example for description, but it is not limited thereto.

Optionally, the optical waveguide module 20 may be selected from an array optical waveguide of a transflective array, an embossed diffractive optical waveguide, a holographic volume grating optical waveguide, and any mix-and-match combination of the above-mentioned optical waveguides.

It should be noted that the two opposite interfaces of the optical waveguide layer 22 are interfaces that satisfy a condition of total reflection. The optical coupling-in part 21 is configured to introduce part of the external light. That is, the external light is radiated to the optical coupling-in part 21, and the optical coupling-in part 21 reflects at least part of the light into the optical waveguide layer 22, so that the light is reflected and propagated between the total reflection interfaces of the optical waveguide layer 22 until the reflected light is radiated to the optical waveguide layer 22. The optical coupling-out part 23 is reflected by the optical coupling-out part 23 to the external camera.

Optionally, the optical waveguide layer 22 is a cover plate. The use of a cover plate as the optical waveguide layer 22 eliminates a need for additional cover plates, which saves materials and reduces a thickness of the display panel 100.

In some embodiments, the optical waveguide layer 22 may also not be a cover plate.

Optionally, the optical coupling-in part 21 is disposed on a side of the optical waveguide layer 22 close to the panel body 10. The optical coupling-in part 21 includes an alignment layer 211 and a liquid crystal polymer film 212 disposed on the alignment layer 211.

Figure 2:
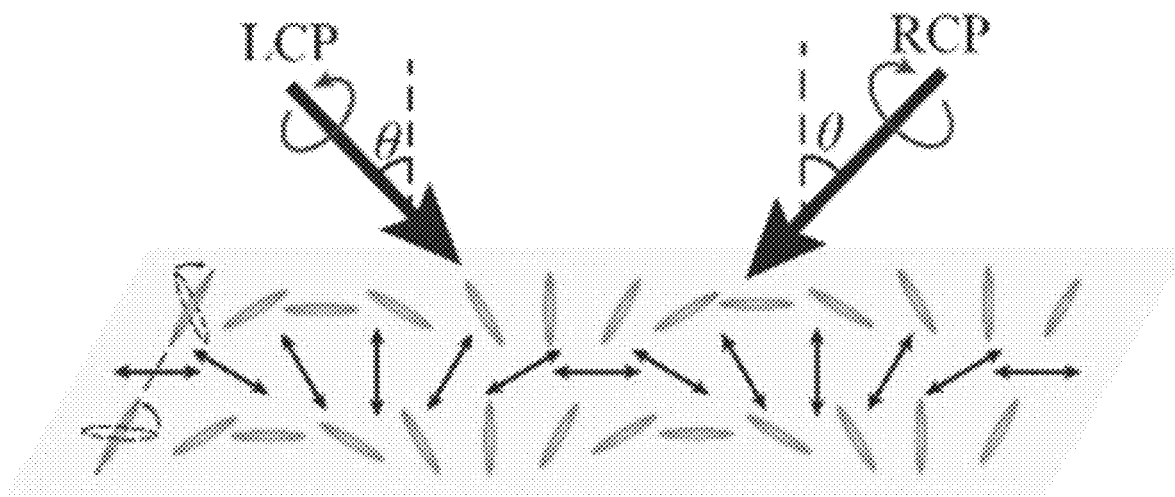
FIG. 2 is a schematic diagram of the preparation of the alignment layer in the display panel provided by the first embodiment of the present application.
Figure 3:
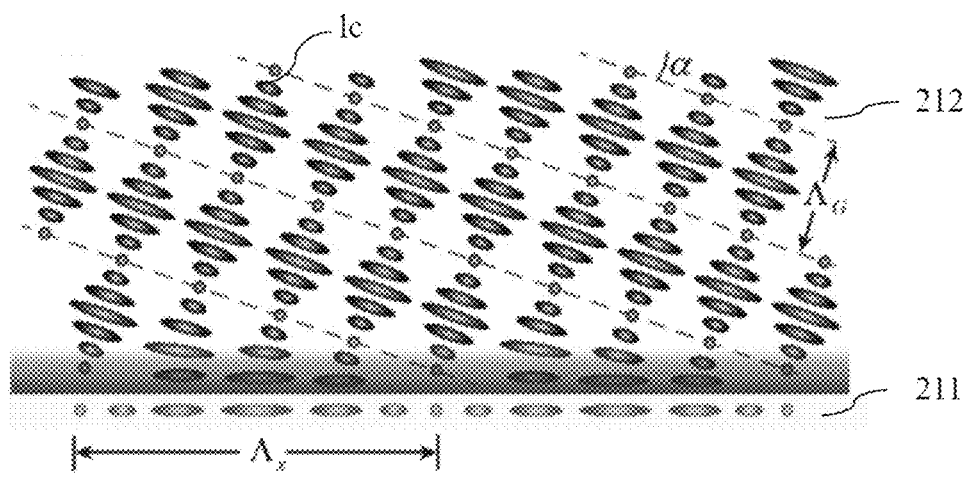
FIG. 3 is a schematic structural diagram of an optical coupling portion in the display panel provided by the first embodiment of the present application.

Referring to FIG. 2 and FIG. 3, a material of the alignment layer 211 may be an AZO (azo) compound. In a manufacturing process, a left chiral laser LCP and a right chiral laser RCP can be applied, that is, double-laser interference exposure, can be applied to make the alignment layer 211 form a linearly polarized alignment direction. Polymerizable cholesterol liquid crystal (PCLC) is coated on the alignment layer 211 forms the liquid crystal polymer film 212 of a tilted helical structure.

Optionally, a material of the polymerizable cholesteric liquid crystal includes a nematic liquid crystal, a chiral agent, a photoinitiator, and a polymerizable monomer. In some embodiments, reactive mesogens can also be used to form polymer networks.

It should be noted that, in chemistry, molecules that have a same composition but are mirror images of each other (enantiomers) in spatial structure are called chiral molecules. A liquid crystal type of the chiral liquid crystal polymer is a cholesteric phase or a smectic phase.

Chiral additives can induce nematic transformation to cholesteric or chiral nematic. For example, left chiral additives can induce nematic liquid crystals to transform into left chiral nematic liquid crystals, right chiral additives can induce nematic liquid crystals to transform into right chiral nematic liquid crystals.

Optionally, the liquid crystal polymer film 212 may be formed by UV-curing polymerization.

Optionally, the liquid crystal polymer film 212 includes a polymer network and cholesteric liquid crystals Ic disposed within a polymer grid.

Please refer to FIG. 3, the inclined helical liquid crystal Ic has a tilt angle $\alpha$, $\alpha=\arcsin(\Lambda_G/\Lambda_x)$, where $\Lambda_x$ is a pattern period in a horizontal direction, $\Lambda_x=2\pi/k_0 \sin\theta$, $k_0$ is wave number, $\theta$ is an incident angle; $\Lambda_G$ is a Bragg period, which is equal to a pitch of a cholesteric liquid crystal Ic. For a light wavelength $\lambda$, the Bragg period $\Lambda_G$ should be equivalent to $\lambda$: $\lambda=2n_{LC}\Lambda_G \sin\varphi$, $n_{LC}$ is an average refractive index of the liquid crystal, and $\varphi$ is an angle between the incident light and the horizontal plane of the material. Optionally, $1.52<n_{LC}<1.56$, for example, $n_{LC}$ may be 1.53, 1.54 or 1.55.

Figure 4:
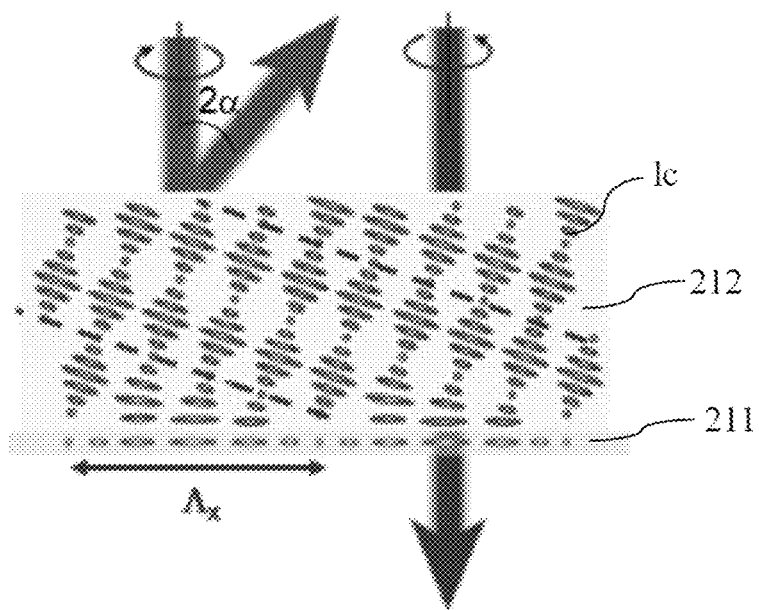
FIG. 4 is a schematic diagram of reflection and transmission of light at the light coupling-in portion in the display panel provided by the first embodiment of the present application.

For example, please refer to FIG. 4, for near-infrared light with $\lambda=1350$ nm, $\Lambda_G=\lambda/(2 n_{LC})=433$-444 nm when $\varphi=90°$ of vertical incidence, select an appropriate chiral agent concentration to achieve this liquid crystal pitch matching.

For normal incident light, circularly polarized light with a same cholesteric as the tilted liquid crystal Ic helical structure is reflected, and circularly polarized light with an opposite chiral of the tilted liquid crystal Ic helical structure is transmitted. For example, the right chiral liquid crystal polymer film 212 reflects right optical rotation light and transmits left optical rotation light. The left chiral liquid crystal polymer film 212 reflects left optical rotation light and transmits right optical rotation light.

The chirality of the liquid crystal polymer film 212 depends on the chiral agent. For example, a left chiral agent can be used to form the left chiral liquid crystal polymer film 212, and a right chiral agent can be used to form the right chiral liquid crystal polymer film 212.

Optionally, the display panel 100 further includes a first linear polarizer 31 and a first quarter-wave plate 41. The first quarter-wave plate 41 is disposed on a side of the optical waveguide module 20 away from the panel body 10. The first linear polarizer 31 is disposed on a side of the first quarter-wave plate 41 away from the panel body 10.

Figure 5:
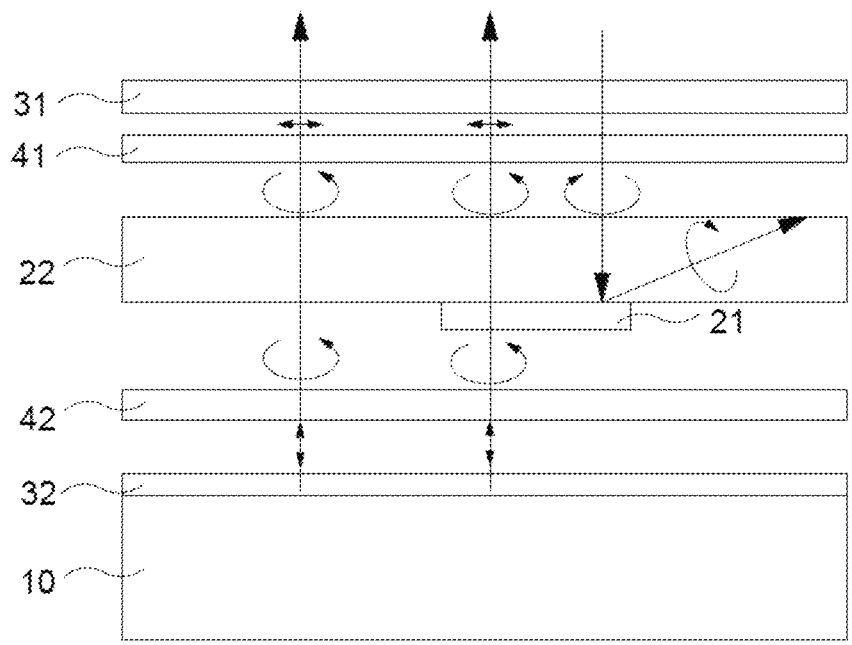
FIG. 5 is a schematic diagram of reflection and transmission of light in the display panel provided by the first embodiment of the present application.

Referring to FIG. 5, a first quarter-wave plate 41 and a first linear polarizer 31 are disposed on a side of the optical waveguide module 20 away from the panel body 10. It can be understood that, the external light has unidirectional optical rotation after passing through the first linear polarizer 31 and the first quarter-wave plate 41, such as left optical rotation light or right optical rotation light. Therefore, the light having the same chirality as the optical coupling-in part 21 is reflected, and the light having the opposite chirality to the optical coupling-in part 21 can pass through the optical coupling-in part 21.

Optionally, the display panel 100 further includes a second linear polarizer 32 and a second quarter-wave plate 42. The second quarter-wave plate 42 is disposed on a side of the optical waveguide module 20 close to the panel body 10. The second linear polarizer 32 is disposed on a side of the second quarter-wave plate 42 close to the panel body 10.

The light emitted from the panel body 10 becomes unidirectional optical rotation when passes through the second linear polarizer 32 and the second quarter-wave plate 42, such as left optical rotation light or right optical rotation light. Therefore, the light having the same chirality as the optical coupling-in part 21 is reflected, and the light having the opposite chirality to the optical coupling-in part 21 can pass through the optical coupling-in part 21.

Optionally, the display panel 100 further includes a display region AA and a frame region NA located on the peripheral side of the display region AA. The photosensitive functional region GG is disposed in the frame region NA. The optical coupling-in part 21 is positioned in the display region AA of the display panel 100, and the optical coupling-out part 23 is positioned in the frame region NA.

In the display panel 100 of the first embodiment, a chirality of the optical coupling-in part 21 is the same as the chirality of the light passing through the first linear polarizer 31 and the first quarter-wave plate 41. A chirality of the optical coupling-in part 21 is contrary to the chirality of the light passing through the second linear polarizer 32 and the second quarter-wave plate 42, so that the panel body 10 can also be fully displayed when the optical coupling-in part 21 is disposed in the display region AA, and there is no need to dig holes on the panel main body 10 or performing special pixel processing on the region opposites to the optical coupling-in part 21, thereby simplifying the manufacturing process of the panel main body 10.

Optionally, a region of the second linear polarizer 32 and the second quarter-wave plate 42 opposites to the light out-coupling portion 23 is a hollowed-out region, so as to prevent the light exported by the light out-coupling portion 23 from passing through the second linear polarizer 32 and the second quarter-wave plate 42, thereby improving an utilization rate of optics.

Figure 6:
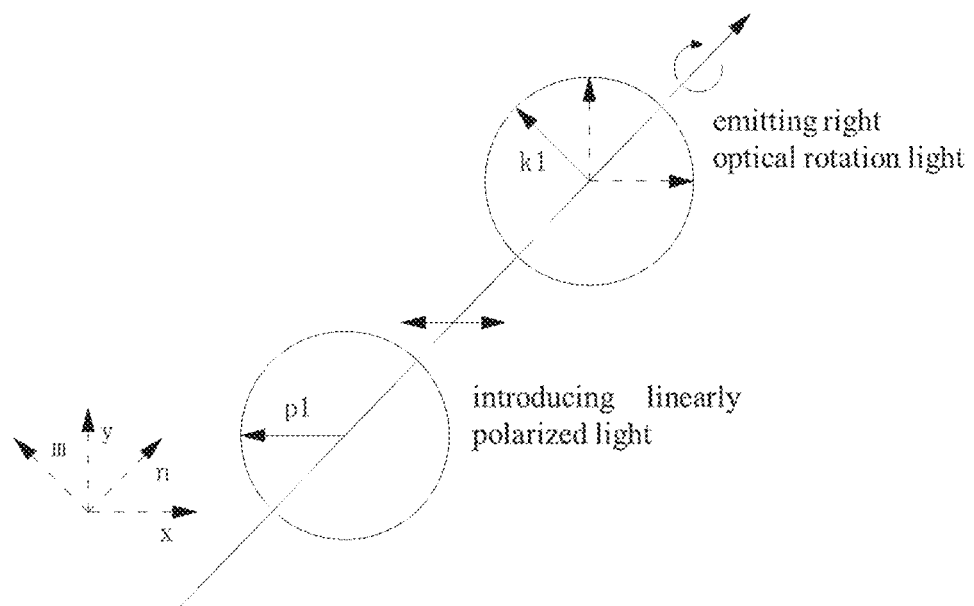
FIG. 6 is a schematic diagram of the external light passing through the first linear polarizer and the first quarter-wave plate in the display panel provided by the first embodiment of the present application.

Referring to FIG. 6, in the display panel 100 of the first embodiment, the first linear polarizer 31 has a first polarization axis p1. The first quarter-wave plate 41 has a first fast axis k1. From a counterclockwise direction of the first fast axis k1, an included angle between the first fast axis k1 and the first polarization axis p1 is 45°. Such an arrangement enables the external light to become right optical rotation light after passing through the first linear polarizer 31 and the first quarter-wave plate 41.

The liquid crystal polymer film 212 is a right chiral liquid crystal polymer film.

The right chiral liquid crystal polymer film 212 is used in combination with the first linear polarizer 31 and the first quarter-wave plate 41 to reflect right optical rotation light and transmit left optical rotation light.

The display panel 100 includes a first direction x, a second direction y, a third direction m, and a fourth direction n. The first direction x is perpendicular to the second direction y, and the third direction m is perpendicular to the fourth direction n. The third direction m is obtained by rotating 45° counterclockwise from the second direction y, and the fourth direction n is obtained by rotating 45° clockwise from the second direction y.

The first fast axis k1 extends along a third direction m when the first polarization axis p1 extends along an opposite direction of the first direction x. The first fast axis k1 extends along a fourth direction n when the first polarization axis p1 extends along the second direction y.

Figure 7:
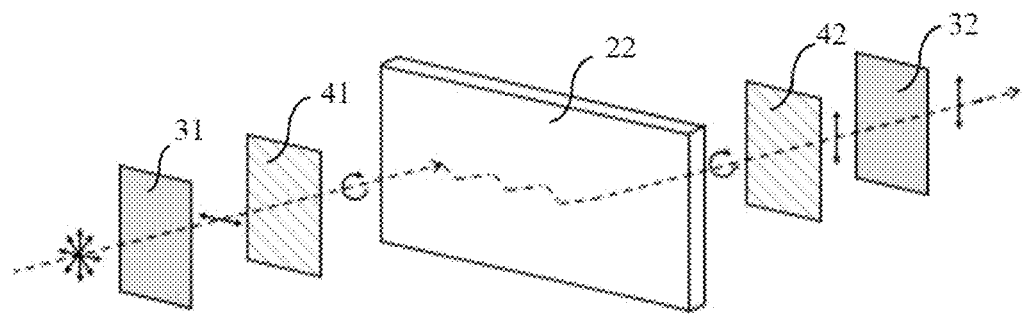
FIG. 7 is a schematic diagram of a propagation of incident light in the display panel provided by the first embodiment of the present application.

Specifically, as shown in FIG. 7, the optical coupling-in part 21 guides the right optical rotation light converted by the first linear polarizer 31 and the first quarter-wave plate 41 into the optical waveguide layer 22, and propagates to the optical coupling-out part 23 through the optical waveguide layer 22, and finally the light is reflected to the photosensitive device through the optical coupling-out part 23.

Figure 8:
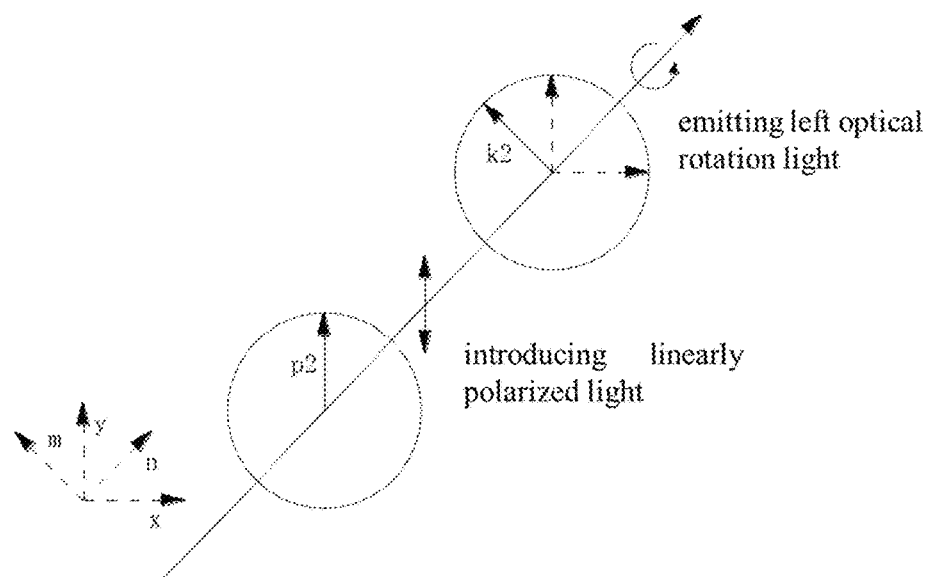
FIG. 8 is a schematic diagram of the display panel provided by the first embodiment of the present application, showing that the display light passes through the second linear polarizer and the second quarter-wave plate.
Figure 9:
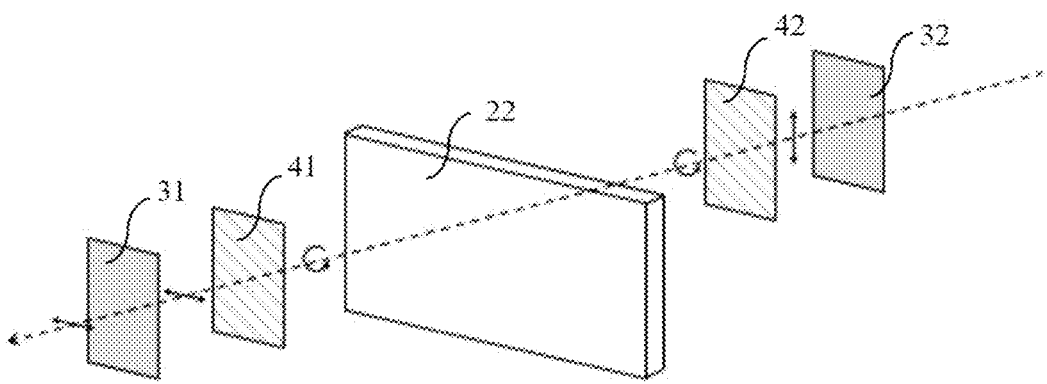
FIG. 9 is a schematic diagram of the propagation of display light in the display panel provided by the first embodiment of the present application.

Optionally, please refer to FIG. 5, FIG. 8, and FIG. 9, the second linear polarizer 32 has a second polarization axis p2. The second quarter-wave plate 42 has a second fast axis k2. The second polarization axis p2 is perpendicular to the first polarization axis p1. A direction of the second fast axis k2 is the same as a direction of the first fast axis k1. From the clockwise direction of the second fast axis k2, the included angle between the second fast axis k2 and the second polarization axis p2 is 45°. Such an arrangement makes the light emitted by the panel body 10 pass through the second linear polarizer 32 and the second quarter-wave plate 42 to become left optical rotation light, so as to pass through the optical coupling-in part 21, and then the left optical rotation light passes through the first quarter wave plate 41 is converted into linearly polarized light having a same polarization direction as the first linear polarizer 31, and then passes through the first linear polarizer 31 to achieve full display.

Optionally, the optical coupling-out part 23 is selected from one of a relief grating, a liquid crystal grating, and an array grating formed in the optical waveguide layer 22, and a chirality of the liquid crystal grating is the same as a chirality of the optical coupling-in part 21.

In the display panel 100 of the first embodiment, the optical coupling-out part 23 is disposed on a side of the optical waveguide layer 22 away from the panel body 10. The optical coupling-out part 23 is a liquid crystal grating. The optical coupling-out part 23 also includes an alignment layer and a liquid crystal polymer film disposed on the alignment layer. A chirality of the optical coupling-out part 23 is the same as a chirality of the optical coupling-in part 21.

Optionally, the display panel 100 further includes a first adhesive layer 51 positioned in the frame region NA of the display panel 100. The first adhesive layer 51 is connected between the optical waveguide module 20 and the first quarter-wave plate 41. A first dielectric layer q1 is provided between the optical waveguide layer 22 and the first quarter-wave plate 41.

A first dielectric layer q1 is provided between the optical waveguide layer 22 and the first quarter-wave plate 41.

The display panel 100 further includes a second adhesive layer 52 positioned in the frame region NA of the display panel 100. The second adhesive layer 52 is connected between the optical waveguide module 20 and the second quarter-wave plate 42. A second dielectric layer q2 is provided between the optical waveguide layer 22 and the second quarter-wave plate 42.

A refractive index of the optical waveguide layer 22 is greater than a refractive index of the first dielectric layer q1 and the second dielectric layer q2, so that a first total reflection interface is formed between the optical waveguide layer 22 and the first dielectric layer q1. A second total reflection interface is formed between the optical waveguide layer 22 and the second dielectric layers q2.

Optionally, the first dielectric layer q1 and the second dielectric layer q2 are both gas layers. The first dielectric layer q1 and the second dielectric layer q2 are transparent solid material layers. The materials of the first dielectric layer q1 and the first adhesive layer 51 are different, and the materials of the second dielectric layer q2 and the second adhesive layer 52 are different when the first dielectric layer q1 and the second dielectric layer q2 are solid material layers.

It should be noted that, referring to FIG. 4, for a normal incident light, the circularly polarized light with a same rotation direction as the inclined screw structure is reflected, and a reflection angle is 2a. To make the reflected light propagate in the optical waveguide layer 22, it is necessary to make the angle of the reflected light greater than or equal to the critical angle of total reflection of the optical waveguide layer 22. That is, $2\alpha \geq \arcsin(n_0/n_1)$, where $n_0$ is a refractive index of air (usually 1), and $n_1$ is a refractive index of the optical waveguide.

Optionally, an inclination angle α of the inclined helical structure needs to satisfy: $15° \leq \alpha \leq 33°$ when $1.1 \leq n_1 \leq 1.9$. That is, $15° \leq \arcsin(\Lambda_G/\Lambda_x) \leq 33°$.

Optionally, n1 may be one of 1.1, 1.2, 1.3, 1.4, 1.5, 1.6, 1.7, 1.8 or 1.9. Optionally, a material of the optical waveguide layer 22 may be a transparent material such as glass.

Figure 10:
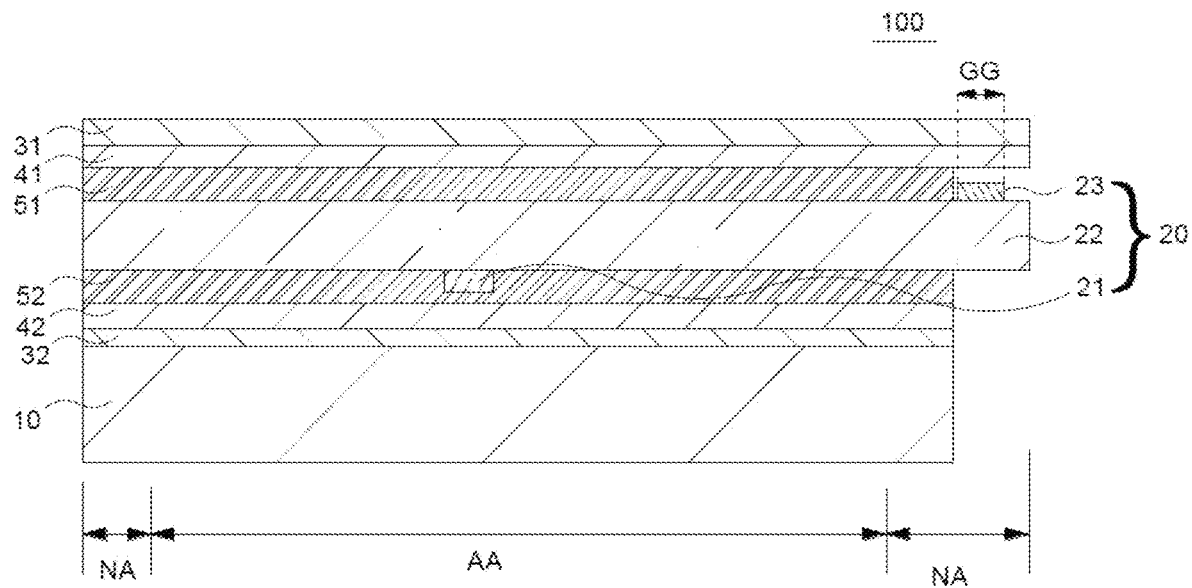
FIG. 10 is another schematic structural diagram of the display panel provided by the first embodiment of the present application.

In some embodiments, please refer to FIG. 10, compared with the above-mentioned frame sticking method, a whole adhesive surface sticking method can also be adopted. That is, the materials of the first dielectric layer q1 and the first adhesive layer 51 are the same. The materials of the second dielectric layer q2 and the second adhesive layer 52 are the same. For example, the display panel 100 further includes the first adhesive layer 51. The first adhesive layer 51 is connected between the optical waveguide module 20 and the first quarter-wave plate 41. An entire surface of the first adhesive layer 51 is adhered to the optical waveguide module 20. A refractive index of the optical waveguide layer 22 is greater than a refractive index of the first adhesive layer 51.

The display panel 100 further includes a second adhesive layer 52 connected between the optical waveguide module 20 and the second quarter-wave plate 42. An entire surface of the second adhesive layer 52 is adhered to the optical waveguide module 20. A refractive index of the optical waveguide layer 22 is greater than a refractive index of the second adhesive layer 52. Optionally, the refractive index of the first adhesive layer 51 is equal to the refractive index of the second adhesive layer 52.

Figure 11:
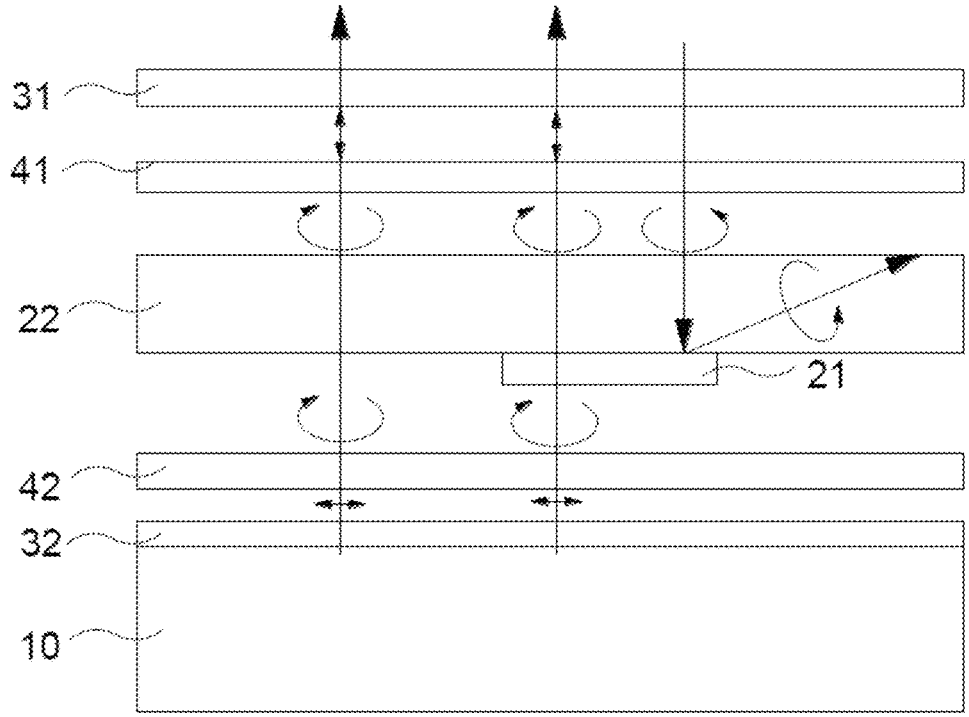
FIG. 11 is a schematic diagram of reflection and transmission of light in the display panel provided by the second embodiment of the present application.
Figure 12:
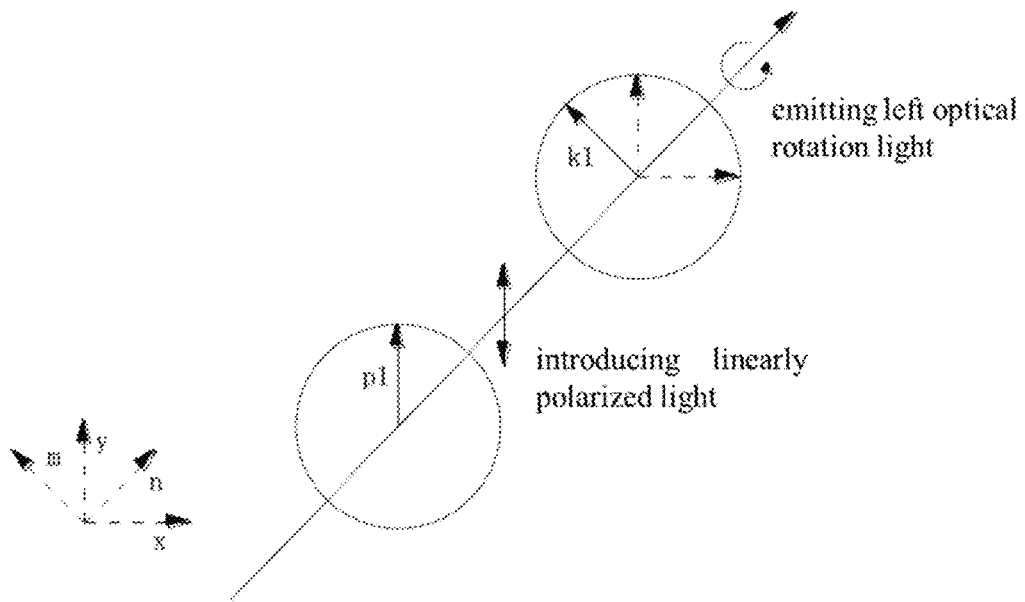
FIG. 12 is a schematic diagram of the external light passing through the first linear polarizer and the first quarter-wave plate in the display panel provided by the second embodiment of the present application.

Referring to FIG. 11, compared with the display panel 100 of the first embodiment, the display panel 100 of the second embodiment is different from the display panel 100 of the first embodiment in that:

The first linear polarizer 31 has a first polarization axis p1. The first quarter-wave plate 41 has a first fast axis k1. From the clockwise direction of the first fast axis k1, an included angle between the first fast axis k1 and the first polarization axis p1 is 45°; as shown in FIG. 12. The liquid crystal polymer film 212 is a left chiral liquid crystal polymer film.

Figure 13:
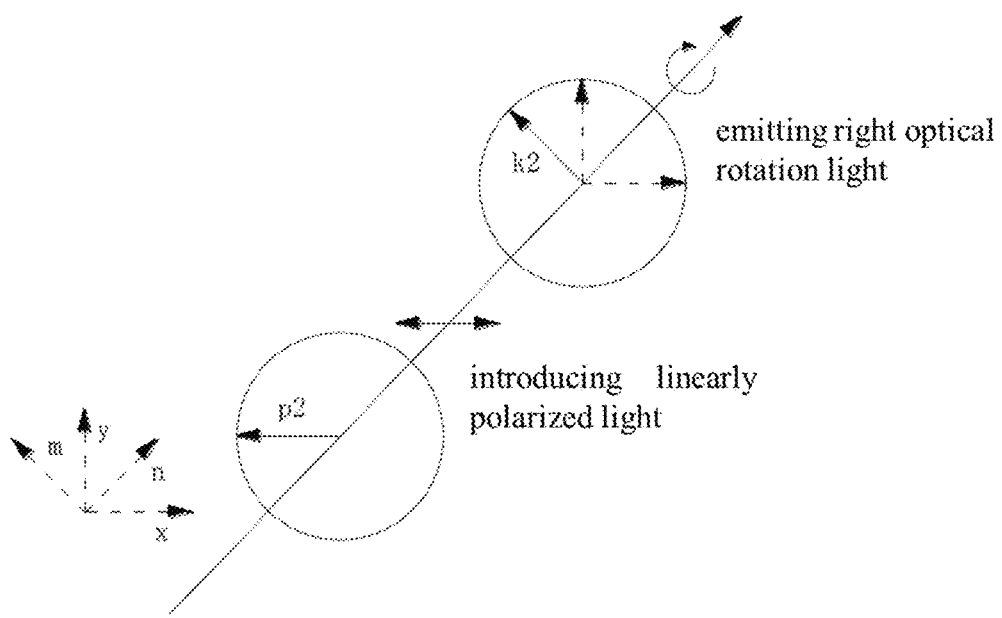
FIG. 13 is a schematic diagram of display light passing through the second linear polarizer and the second quarter-wave plate in the display panel provided by the second embodiment of the present application.

The second linear polarizer 32 has a second polarization axis p2. The second quarter-wave plate 42 has a second fast axis k2. The second polarization axis p2 is perpendicular to the first polarization axis p1. The direction of the second fast axis k2 is the same as the direction of the first fast axis k1. From the counterclockwise direction of the second fast axis k2, a included angle between the second fast axis k2 and the first polarization axis p1 is 45°; as shown in FIG. 13.

The left chiral liquid crystal polymer film 212 is used in combination with the first linear polarizer 31 and the first quarter-wave plate 41 to reflect the left optical rotation light and transmit the right optical rotation light.

The first fast axis k1 extends along the third direction m when the first polarization axis p1 extends along the second direction y, as shown in FIG. 12. The first fast axis k1 extends along an opposite direction of the fourth direction n when the first polarization axis p1 extends along the opposite direction of the first direction x.

Specifically, the optical coupling-in part 21 guides the left optical rotation light converted by the first linear polarizer 31 and the first quarter-wave plate 41 into the optical waveguide layer 22, and propagates through the optical waveguide layer 22 to the optical coupling-out part 23. Finally, the light is reflected to a photosensitive device through the optical coupling-out part 23.

The light emitted by the panel main body 10 becomes right optical rotation light after passing through the second linear polarizer 32 and the second quarter-wave plate 42, so as to pass through the optical coupling-in part 21 to realize full display.

Optionally, the optical coupling-out part 23 is selected from one of a relief grating, a liquid crystal grating, and an array grating formed in the optical waveguide layer 22. The chirality of the liquid crystal grating is the same as the chirality of the optical coupling-in part 21.

In the display panel 100 of the second embodiment, the optical coupling-out part 23 is disposed on a side of the optical waveguide layer 22 away from the panel body 10. The optical coupling-out part 23 is a liquid crystal grating. The optical coupling-out part 23 also includes an alignment layer and a liquid crystal polymer film disposed on the alignment layer. The chirality of the optical coupling-out part 23 is the same as the chirality of the optical coupling-in part 21.

Figure 14:
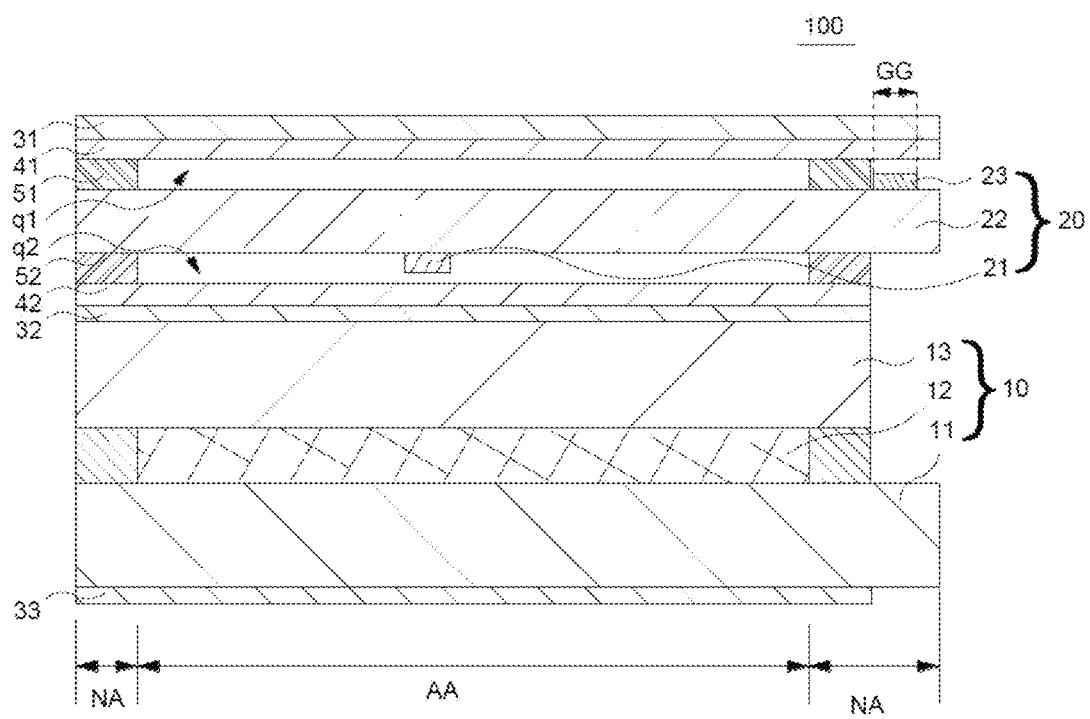
FIG. 14 is a schematic structural diagram of the display panel provided by a third embodiment of the present application.

Referring to FIG. 14, the display panel 100 of the third embodiment is different from the above-mentioned embodiments in that:

The panel main body 10 is a liquid crystal panel main body. The display panel 100 further includes a third linear polarizer 33. The third linear polarizer 33 is disposed on a side of the panel body 10 away from the second linear polarizer 32. The third linear polarizer 33 has a third polarization axis, and the third polarization axis is perpendicular to the second polarization axis p2.

In the third embodiment, the panel body 10 includes an array substrate 11, a liquid crystal layer 12, and a opposite substrate 13. The liquid crystal layer 12 is provided between the array substrate 11 and the opposite substrate 13.

Optionally, the opposite substrate 13 may be a conventional color filter substrate with a color filter layer, or may be a color filter substrate with the color filter layer transferred to the array substrate.

Figure 15:
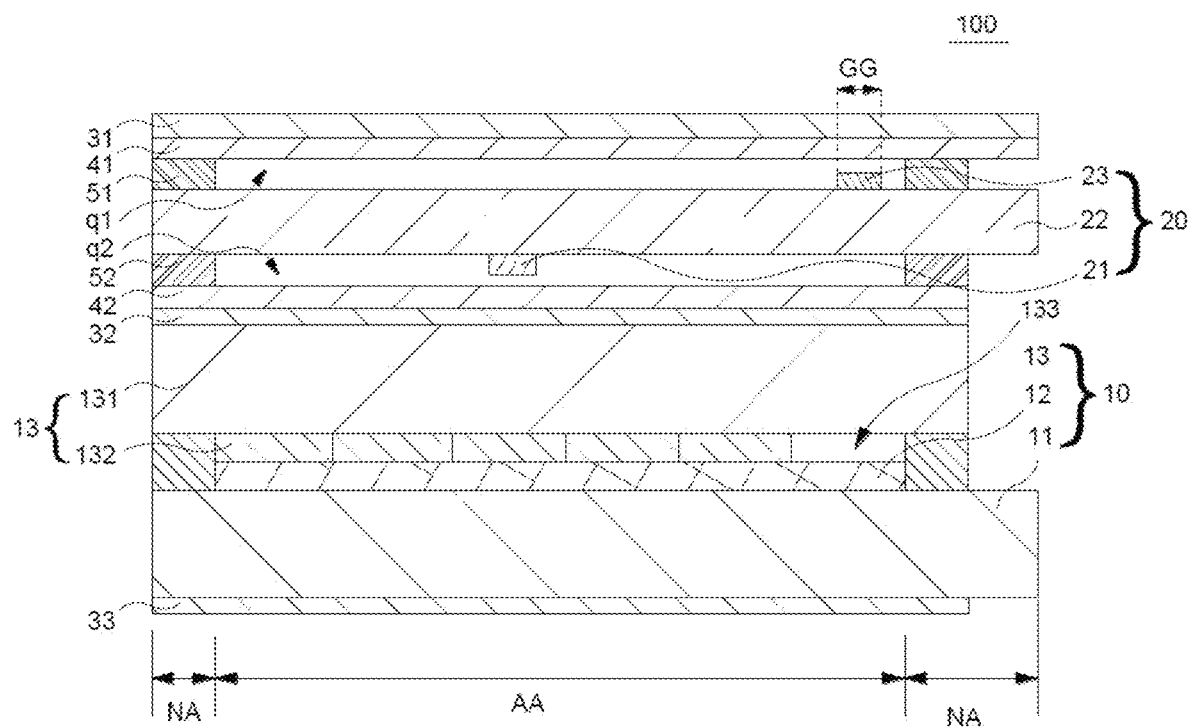
FIG. 15 is a schematic structural diagram of the display panel provided by a fourth embodiment of the present application.

Referring to FIG. 15, a difference between the display panel 100 of the fourth embodiment and the above-mentioned embodiments is that the photosensitive functional region GG is disposed in the display region AA. The optical coupling-in part 21 is positioned in the display region AA of the display panel 100. The optical coupling-out part 23 is also positioned in the display region AA, and is positioned in the region where no content is displayed in the display region AA.

Optionally, the second linear polarizer 32 and the second quarter-wave plate 42 are respectively disposed to overlap with the optical coupling-out part 23.

The display panel 100 of the fourth embodiment is described by taking the panel main body 10 as an example of a liquid crystal panel main body.

The panel body 10 includes an array substrate 11, a liquid crystal layer 12, and an opposite substrate 13. The liquid crystal layer 12 is provided between the array substrate 11 and the opposite substrate 13. The opposite substrate 13 includes a base substrate 131 and a color filter layer 132 disposed on a side of the base substrate 131 close to the liquid crystal layer 12. The color filter layer 132 is provided with an opening 133 opposite to the optical coupling-out part 23.

Figure 16:
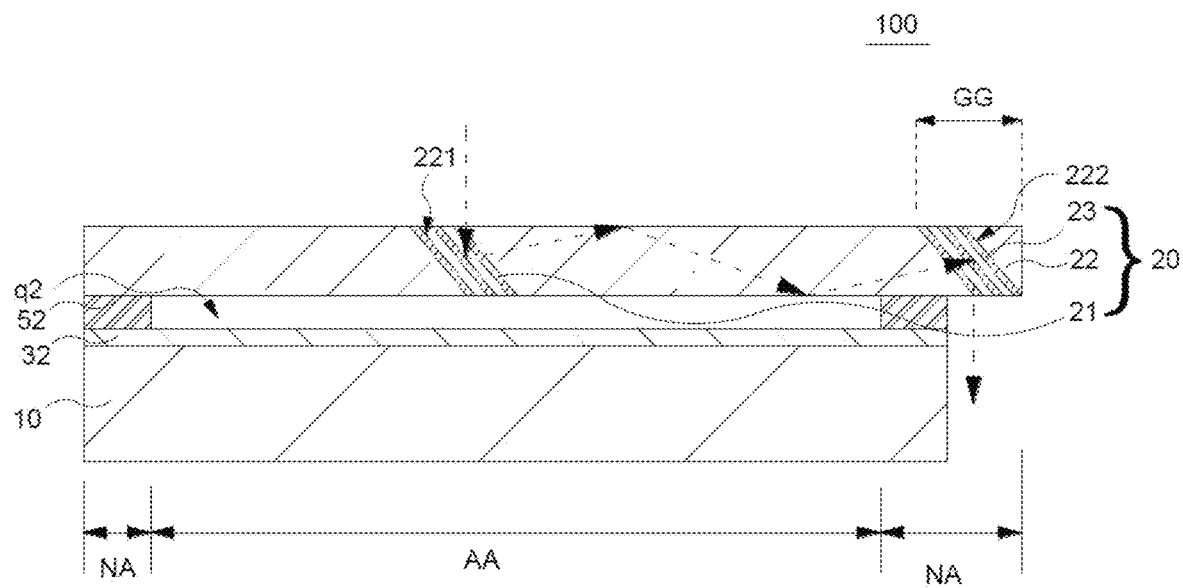
FIG. 16 is a schematic structural diagram of the display panel provided by a fifth embodiment of the present application.

Referring to FIG. 16, the display panel 100 of the fifth embodiment is different from the above-mentioned embodiments in that:

The optical waveguide module 20 is an array optical waveguide of a transflective array. That is, the optical waveguide layer 22 is provided with a plurality of inclined first through holes 221 and second through holes 222. An extending direction of the first through hole 221 and an extending direction of the second through hole respectively intersect with a plane wherein the optical waveguide layer 22 is positioned.

Optionally, the extending direction of the first through hole 221 is parallel to the extending direction of the second through hole 222.

The optical coupling-in part 21 is a first transflective film layer, and the first transflective film layer covers a side wall of the first through hole 221. The reflection surface of the first transflective film layer faces the optical coupling-out part 23.

The optical coupling-out part 23 is a second semi-reflective film layer, and the second semi-reflective film layer covers a side wall of the second through hole 222. The reflection surface of the second transflective film layer faces the optical coupling-in part 21.

The display panel 100 of the fifth embodiment adopts an array optical waveguide as the optical waveguide module 20, which can save the first linear polarizer 31, the first quarter-wave plate 41, and the second quarter-wave plate 42 compared with the holographic volume grating optical waveguide of the above-mentioned embodiment.

In addition, since the optical coupling-in part 21 and the optical coupling-out part 23 are formed in the optical waveguide layer 22, it is beneficial to thin the optical waveguide module 20.

Figure 17:
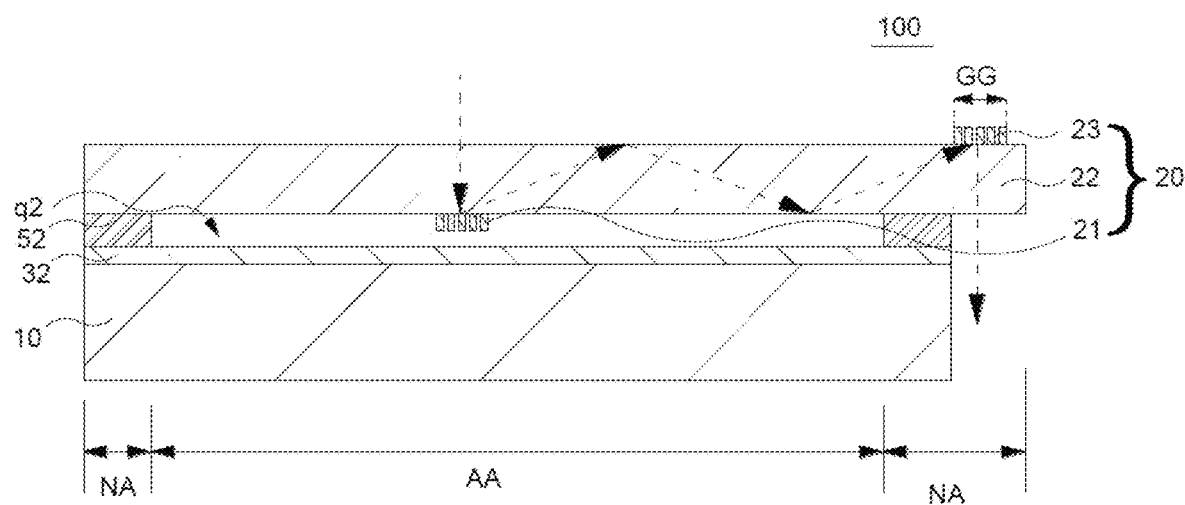
FIG. 17 is a schematic structural diagram of the display panel provided by a sixth embodiment of the present application.

Referring to FIG. 17, the display panel 100 of the sixth embodiment is different from the above-mentioned embodiments in that:

The optical waveguide module 20 is an embossed diffractive optical waveguide. That is, both the optical coupling-in part 21 and the optical coupling-out part 23 are nano-gratings. The optical coupling-in part 21 is disposed on the side of the optical waveguide layer 22 close to the panel body 10. The optical coupling-out part 23 is disposed on the side of the optical waveguide layer 22 away from the panel body.

Compared with the holographic volume grating optical waveguide of the above-mentioned embodiment, the display panel 100 of the sixth embodiment can save the first linear polarizer 31, the first quarter-wave plate 41, and the second quarter-wave plate 42. Compared with the fifth embodiment, the process is simplified.

Figure 18:
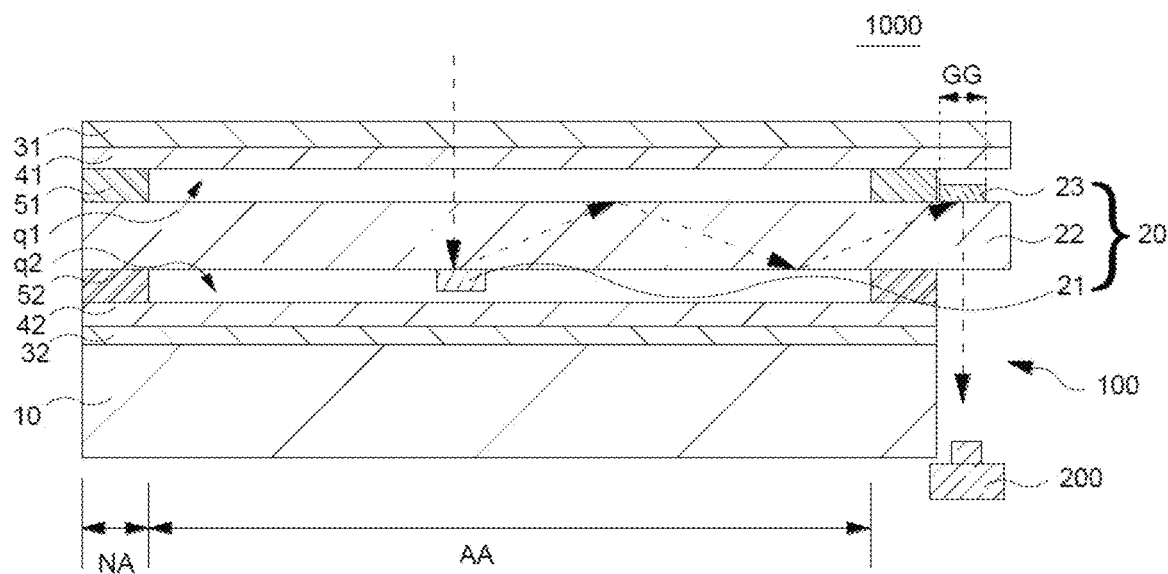
FIG. 18 is a schematic structural diagram of a display device provided by one embodiment of the present application.

Please refer to FIG. 18, correspondingly, embodiments of the present application further provide a display device 1000, which includes a camera 200 and the display panel 100 according to any one of the above embodiments. The camera 200 is disposed oppositely to the photosensitive functional region GG, and is positioned on a side of the panel body 10 away from the optical waveguide module 20.

It should be noted that the structure of the display panel 100 of the display device 1000 of this embodiment is similar or the same as the structure of the display panel 100 of the above-mentioned embodiments. For details, please refer to the descriptions on the display panel 100 in the above embodiments, which will not be repeated here.

The display device 1000 of this embodiment is described by taking the display panel 100 of the first embodiment as an example, but it is not limited thereto.

Optionally, the camera 200 is an infrared camera. The display device 1000 of the present embodiment adopts the infrared camera to facilitate acquiring an image of the user in a weak light or dark environment, and is configured to real-time monitor fatigue of the user.

In some embodiments, the camera 200 may also be a non-infrared camera, such as a visible light camera.

In the display device 1000 of the embodiment of the present application, the display panel 100 includes a photosensitive functional region GG, and the optical waveguide module 20 is disposed on the light-emitting side of the panel main body 10. The optical waveguide module 20 includes an optical coupling-in part 21, an optical waveguide layer 22, and an optical coupling out part 23. The optical coupling-out part 23 is positioned on a side of the optical coupling-in part 21 and opposites to the photosensitive functional region GG.

It can be understood that, the optical coupling-in part 21 is configured to introduce part of the light from the outside world. The optical waveguide layer 22 is configured to guide the light introduced by the optical coupling-in part 21. The optical coupling-out part 23 is configured to lead out the light in the optical waveguide layer 22. That is, in the first embodiment, the incident light from the outside can be conducted to the region of the light coupling-out part 23, and the light can be led out by the light-coupling-out part 23 to the external camera. Therefore, the external camera can also be flexibly set according to the actual location needs.

In addition, the display region AA of the panel main body 10 does not need to dig holes or design special pixels when the optical coupling-out part 23 is positioned in the non-display area NA (frame area), so that the full display effect can be achieved.

Figure 19:
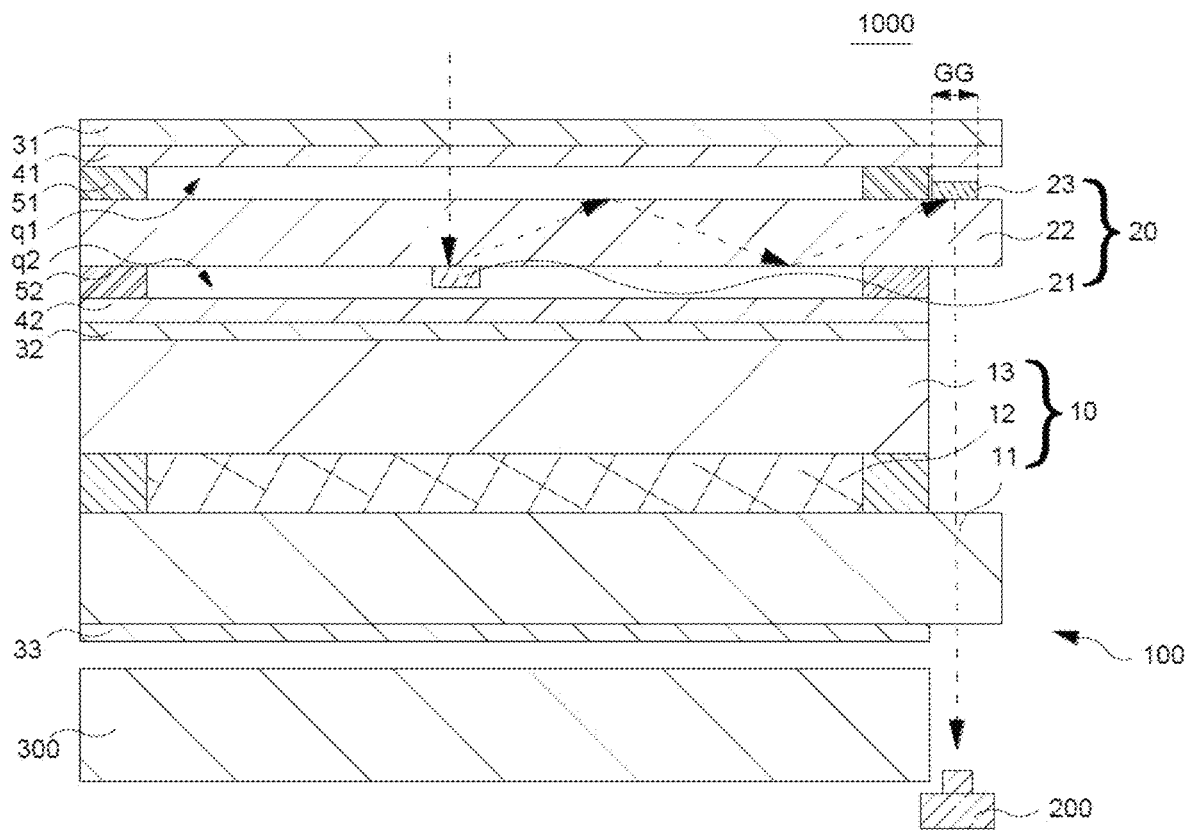
FIG. 19 is another schematic structural diagram of the display device provided by one embodiment of the present application.

Referring to FIG. 19, in some embodiments, the display device 1000 of this embodiment may also take the panel body 10 as the liquid crystal panel body as an example. The display device 1000 of this embodiment is described by taking the display panel 100 of the third embodiment as an example.

The display device 1000 further includes a backlight module 300, and the backlight module 300 is disposed on a back of the display panel 100.

A display panel and a display device are provided by the embodiments of the present application have been described in detail above, and the principles and implementations of the present application are described with specific examples. The descriptions of the above embodiments are only used to help understand the present application. At the same time, for those skilled in the art, according to the idea of the present application, there will be changes in a specific implementation and an application scope. In summary, the content of this specification should not be construed as limitations of the present application.

What is claimed is:

1. A display panel comprising a photosensitive functional region, wherein the display panel further comprises:
    a panel body;
    an optical waveguide module, wherein the optical waveguide module is disposed on a light emitting side of the panel body, wherein the optical waveguide module comprises an optical coupling-in part, an optical waveguide layer, and an optical coupling-out part, wherein the optical coupling-in part is connected to the optical waveguide layer, the optical coupling-out part is connected to the optical waveguide layer, and wherein the optical coupling-out part is positioned on a side of the optical coupling-in part and opposites to the photosensitive functional region;
    a first linear polarizer, a first quarter-wave plate, a second linear polarizer, and a second quarter-wave plate; wherein the first quarter-wave plate is disposed on a side of the optical waveguide module away from the panel body, and the first linear polarizer is disposed on a side of the first quarter-wave plate away from the panel body; and wherein the second quarter-wave plate is disposed on a side of the optical waveguide module close to the panel body, and the second linear polarizer is disposed on a side of the second quarter-wave plate close to the panel body;
    a first adhesive layer positioned in a frame region of the display panel, wherein the first adhesive layer is connected between the optical waveguide module and the first quarter-wave plate, wherein a first dielectric layer is disposed between the optical waveguide layer and the first quarter-wave plate, and wherein a refractive index of the optical waveguide layer is greater than a refractive index of the first dielectric layer refractive index; and
    a second adhesive layer positioned in the frame region of the display panel, wherein the second adhesive layer is connected between the optical waveguide module and the second quarter-wave plate, wherein a second dielectric layer is disposed between the optical waveguide layer and the second quarter-wave plate, and wherein a refractive index of the optical waveguide layer is greater than a refractive index of the second dielectric layer.

2. The display panel according to claim 1, wherein the optical coupling-in part is provided on a side of the optical waveguide layer close to the panel body, and wherein the optical coupling-in part comprises an alignment layer and a liquid crystal polymer film which is provided on the alignment layer.

3. The display panel according to claim 2, wherein the first linear polarizer has a first polarization axis, wherein the first quarter-wave plate has a first fast axis, and wherein an angle between the first fast axis and the first polarization axis is 45°; and
    wherein the liquid crystal polymer film is a right chiral liquid crystal polymer film.

4. The display panel according to claim 3, wherein the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the second polarization axis is 45° from a clockwise direction of the second fast axis.

5. The display panel according to claim 4, wherein the display panel further comprises a display region and the frame region positioned on a peripheral side of the display region, wherein the photosensitive functional region is disposed in the frame region, and wherein the optical coupling-in part is positioned in the display region of the display panel, and wherein the optical coupling-out part is positioned in the frame region.

6. The display panel according to claim 5, wherein the optical coupling-out part is selected from one of an embossed grating, a liquid crystal grating, and an array grating formed in the optical waveguide layer, and wherein a chiral direction of the liquid crystal grating is the same as a chiral direction of the optical coupling-in part.

7. The display panel according to claim 4, wherein the panel body is a liquid crystal panel body, wherein the display panel further comprises a third linear polarizer, wherein the third linear polarizer is disposed on a side of the panel body away from the second polarizer, wherein the third linear polarizer has a third polarization axis, and wherein the third polarization axis is perpendicular to the second polarization axis.

8. The display panel according to claim 2, wherein the first linear polarizer has a first polarization axis, wherein the first quarter-wave plate has a first fast axis, and wherein an angle between the first fast axis and the first polarization axis is 45° from a clockwise direction of the first fast axis; and
wherein the liquid crystal polymer film is a left chiral liquid crystal polymer film.

9. The display panel according to claim 8, wherein the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the first polarization axis is 45° from a counterclockwise direction of the second fast axis.

10. The display panel according to claim 1, wherein the optical waveguide layer is a cover plate.

11. A display device comprising a camera and the display panel as claimed in claim 1,
wherein the camera is disposed oppositely to the photosensitive functional region, and wherein the camera is positioned on a side of the panel body away from the optical waveguide module.

12. The display device according to claim 11, wherein the camera is an infrared camera.

13. The display device according to claim 11, wherein the optical coupling-in part is provided on a side of the optical waveguide layer close to the panel body, and wherein the optical coupling-in part comprises an alignment layer and a liquid crystal polymer film which is provided on the alignment layer.

14. The display device according to claim 13, wherein the first linear polarizer has a first polarization axis, wherein the first quarter-wave plate has a first fast axis, and wherein an angle between the first fast axis and the first polarization axis is 45°; and
wherein the liquid crystal polymer film is a right chiral liquid crystal polymer film.

15. The display device according to claim 14, wherein the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the second polarization axis is 45° from a clockwise direction of the second fast axis.

16. The display device according to claim 13, wherein the first linear polarizer has a first polarization axis, wherein the first quarter-wave plate has a first fast axis, and wherein an angle between the first fast axis and the first polarization axis is 45° from a clockwise direction of the first fast axis; and
wherein the liquid crystal polymer film is a left chiral liquid crystal polymer film.

17. The display device according to claim 16, wherein the second linear polarizer has a second polarization axis, wherein the second quarter-wave plate has a second fast axis, wherein the second polarization axis is perpendicular to the first polarization axis, wherein a direction of the second fast axis is consistent with a direction of the first fast axis, and wherein an angle between the second fast axis and the first polarization axis is 45° from a counterclockwise direction of the second fast axis.

18. The display panel according to claim 1, wherein both of the first dielectric layer and the second dielectric layer are gas layers or transparent solid material layers.

19. A display panel comprising a photosensitive functional region, wherein the display panel further comprises:
a panel body;
an optical waveguide module, wherein the optical waveguide module is disposed on a light emitting side of the panel body, wherein the optical waveguide module comprises an optical coupling-in part, an optical waveguide layer, and an optical coupling-out part, wherein the optical coupling-in part is connected to the optical waveguide layer, the optical coupling-out part is connected to the optical waveguide layer, and wherein the optical coupling-out part is positioned on a side of the optical coupling-in part and opposites to the photosensitive functional region; wherein the optical coupling-in part is provided on a side of the optical waveguide layer close to the panel body, and wherein the optical coupling-in part comprises an alignment layer and a liquid crystal polymer film which is provided on the alignment layer; and
a first linear polarizer and a first quarter-wave plate, wherein the first quarter-wave plate is disposed on a side of the optical waveguide module away from the panel body, and wherein the first linear polarizer is disposed on a side of the first quarter-wave plate away from the panel body;
wherein the first linear polarizer has a first polarization axis, the first quarter-wave plate has a first fast axis, and an angle between the first fast axis and the first polarization axis is 45°; and wherein the liquid crystal polymer film is a right chiral liquid crystal polymer film.

20. A display panel comprising a photosensitive functional region, wherein the display panel further comprises:
a panel body;
an optical waveguide module, wherein the optical waveguide module is disposed on a light emitting side of the panel body, wherein the optical waveguide module comprises an optical coupling-in part, an optical waveguide layer, and an optical coupling-out part, wherein the optical coupling-in part is connected to the optical waveguide layer, the optical coupling-out part is connected to the optical waveguide layer, and wherein the optical coupling-out part is positioned on a side of the optical coupling-in part and opposites to the photosensitive functional region; wherein the optical coupling-in part is provided on a side of the optical waveguide layer close to the panel body, and wherein the optical coupling-in part comprises an alignment layer and a liquid crystal polymer film which is provided on the alignment layer; and a first linear polarizer and a first quarter-wave plate, wherein the first quarter-wave plate is disposed on a side of the optical waveguide module away from the panel body, and wherein the first linear polarizer is disposed on a side of the first quarter-wave plate away from the panel body;

wherein the first linear polarizer has a first polarization axis, the first quarter-wave plate has a first fast axis, and an angle between the first fast axis and the first polarization axis is 45° from a clockwise direction of the first fast axis; and wherein the liquid crystal polymer film is a left chiral liquid crystal polymer film.

\* \* \* \* \*